US010931965B2

(12) United States Patent
Zhao et al.

(10) Patent No.: US 10,931,965 B2
(45) Date of Patent: Feb. 23, 2021

(54) DEVICES AND METHODS FOR VIDEO CODING USING SEGMENTATION BASED PARTITIONING OF VIDEO CODING BLOCKS

(71) Applicant: Huawei Technologies Co., Ltd., Shenzhen (CN)

(72) Inventors: Zhijie Zhao, Munich (DE); Max Blaeser, Aachen (DE); Mathias Wien, Aachen (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/227,317

(22) Filed: Dec. 20, 2018

(65) Prior Publication Data

US 2019/0124356 A1    Apr. 25, 2019

Related U.S. Application Data

(63) Continuation of application No. PCT/EP2016/064707, filed on Jun. 24, 2016.

(51) Int. Cl.
*H04N 19/52* (2014.01)
*H04N 19/11* (2014.01)
(Continued)

(52) U.S. Cl.
CPC .......... *H04N 19/52* (2014.11); *H04N 19/119* (2014.11); *H04N 19/147* (2014.11);
(Continued)

(58) Field of Classification Search
CPC ..... H04N 19/52; H04N 19/147; H04N 19/119
(Continued)

(56) References Cited

U.S. PATENT DOCUMENTS

2007/0065025 A1    3/2007  Paniconi et al.
2011/0200109 A1    8/2011  Joshi et al.
(Continued)

FOREIGN PATENT DOCUMENTS

CN    101283364 A    10/2008
CN    103004206 A    3/2013
(Continued)

OTHER PUBLICATIONS

Jager et al., "Simplified Depth-based Block Partitioning and Prediction Merging in 3D Video Coding," Institute of Electrical and Electronics Engineers, New York, New York (2014).
(Continued)

*Primary Examiner* — Jeffrey A Williams
(74) *Attorney, Agent, or Firm* — Leydig, Voit & Mayer, Ltd.

(57) ABSTRACT

The invention relates to an encoding apparatus for processing a video signal comprising a plurality of frames dividable into video coding blocks. A first video coding block of a current frame of the video signal is partitioned into a first segment associated with a first segment motion vector relative to a first reference frame of the video signal and a second segment. The first video coding block is associated with a plurality of virtual partitions. Each virtual partition is associated with a respective subset of the plurality of video coding blocks of the current frame. Each video coding block of the respective subset neighbors the first video coding block and is associated with a motion vector.

15 Claims, 12 Drawing Sheets

(51) Int. Cl.
| | |
|---|---|
| *H04N 19/147* | (2014.01) |
| *H04N 19/176* | (2014.01) |
| *H04N 19/119* | (2014.01) |
| *H04N 19/513* | (2014.01) |
| *H04N 19/91* | (2014.01) |

(52) U.S. Cl.
CPC ......... *H04N 19/176* (2014.11); *H04N 19/521* (2014.11); *H04N 19/91* (2014.11)

(58) Field of Classification Search
USPC .................................................. 375/240.16
See application file for complete search history.

(56) References Cited

U.S. PATENT DOCUMENTS

| | | | |
|---|---|---|---|
| 2012/0177106 | A1 | 7/2012 | Divorra Escoda et al. |
| 2012/0307905 | A1* | 12/2012 | Kim ................. H04N 19/52 375/240.16 |
| 2013/0136184 | A1* | 5/2013 | Suzuki ............. H04N 19/124 375/240.16 |
| 2013/0287109 | A1 | 10/2013 | Wang et al. |
| 2013/0287116 | A1 | 10/2013 | Helle et al. |
| 2018/0278959 | A1 | 9/2018 | Suzuki et al. |
| 2019/0052879 | A1 | 2/2019 | Oh et al. |

FOREIGN PATENT DOCUMENTS

| | | |
|---|---|---|
| CN | 103096071 A | 5/2013 |
| CN | 103314587 A | 9/2013 |
| CN | 103477635 A | 12/2013 |
| CN | 103797799 A | 5/2014 |
| CN | 104185988 A | 12/2014 |
| EP | 2597874 A1 | 5/2013 |
| EP | 2704441 B1 | 9/2015 |
| WO | 2008016605 A2 | 2/2008 |
| WO | 2008150113 A1 | 12/2008 |
| WO | 2009051719 A2 | 4/2009 |
| WO | 2011103213 A2 | 8/2011 |
| WO | 2011127819 A1 | 10/2011 |
| WO | 2013067939 A1 | 5/2013 |
| WO | 2013068562 A1 | 5/2013 |
| WO | 2013068564 A1 | 5/2013 |
| WO | 2013068566 A1 | 5/2013 |
| WO | 2013165808 A1 | 11/2013 |
| WO | 2015007348 A1 | 1/2015 |
| WO | 2015139762 A1 | 9/2015 |

OTHER PUBLICATIONS

Sullivan et al., "Overview of the High Efficiency Video Coding (HEVC) Standard," IEEE Transactions on Circuits and Systems for Video Technology, vol. 22, No. 12, pp. 1649-1668, Institute of Electrical and Electronics Engineers, New York, New York (Dec. 2012).
Chen et al., "Object Boundary Based Motion Partition for Video Coding," Picture Coding Symposium, pp. 1-4 (2007).
Condo et al., "A Motion Compensation Technique Using Sliced Blocks in Hybrid Video Coding," IEEE International Conference on Image Processing 2005, pp. 1-4, Institute of Electrical and Electronics Engineers, New York, New York (2005).
Escoda et al., "Geometry-Adaptive Block Partitioning for Video Coding," IEEE International Conference on Acoustics, Speech and Signal Processing—ICASSP 2007, pp. 1-4, "07, Institute of Electrical and Electronics Engineers, New York, New York (2007).
Mathew et al., "Joint Scalable Modeling of Motion and Boundary Geometry with Quad-Tree Node Merging," Institute of Electrical and Electronics Engineers, New York, New York (2009).
Guo et al., "Simplified Geometry-Adaptive Block Partitioning for Video Coding," 2010 IEEE 17th International Conference on Image Processing, Institute of Electrical and Electronics Engineers, New York, New York (2010).
Wang et al., "Complexity-Reduced Geometry Partition Search and High Efficiency Prediction for Video Coding," Institute of Electrical and Electronics Engineers, New York, New York (2012).
Wang et al., "Complexity Reduction and Performance Improvement for Geometry Partitioning in Video Coding," IEEE Transactions on Circuits and Systems for Video Technology, vol. 23, No. 2, pp. 338-352, Institute of Electrical and Electronics Engineers, New York, New York (Feb. 2013).
Otsu, "A Threshold Selection Method from Gray-Level Histograms," IEEE Transactions on Systems, Man, and Cybernetics, vol. SMC-9, No. 1, pp. 62-66, Institute of Electrical and Electronics Engineers, New York, New York (Jan. 1979).
Achanta et al., "Slic Superpixels Compared to State-of-the-Art Superpixel Methods," IEEE Transactions on Pattern Analysis and Machine Intelligence, vol. 34, No. 11, pp. 2274-2281, Institute of Electrical and Electronics Engineers, New York, New York (Nov. 2012).
Maji, et a., "Biased Normalized Cuts," pp. 2057-2064 (2011).
Zheng et al., "Flexible macroblock partition for inter-frame coding," Joint Collaborative Team on Video Coding (JCT-VC) of ITU-T SG16 WP3 and ISO/IEC JTC1/SC29/WG11, 1st Meeting, Dresden, DE, JCTVC-A029, International Telecommunication Union, Geneva, Switzerland (Apr. 15-23, 2010).
Karczewicz et al., "Video coding technology proposal by Qualcomm Inc.," Joint Collaborative Team on Video eroding (JCT-VC) of ITU-T SG16 WP3 and ISO/IEC JTC1/SC29/WG11,1st Meeting, Dresden, DE, JCTVC-A121, International Telecommunication Union, Geneva, Switzerland (Apr. 15-23, 2010).
Guo et al., "TE 3: Simplified Geometry Block Partitioning," Joint Collaborative Team on Video Coding (JCT-VC) of ITU-T SG16 WP3 and ISO/IEC JTC1/SC29/WG11, 2nd Meeting, Geneva, CH, JCTVC-B085, International Telecommunication Union, Geneva, Switzerland (Jul. 21-28, 2010).
Francois et al., "CE2: Summary of Core Experiment 2 on Flexible Motion Partitioning," Joint Collaborative Team on Video Coding (JCT-VC) of ITU-T SG16 WP3 and ISO/IEC JTC1/SC29/WG11, 4rd Meeting, Daegu, KR, Document JCTVC-D229r1, WG11 No. m18989, International Telecommunication Union, Geneva, Switzerland (Jan. 20-28, 2011).
Bordes et al., "CE2: Unified solution of flexible motion partitioning," Joint Collaborative Team on Video Coding (JCT-VC) of ITU-T SG16 WP3 and ISO/IEC JTC1/SC29/WG11, 5th Meeting, Geneva, CH, JCTVC-E374, International Telecommunication Union, Geneva, Switzerland (Mar. 16-23, 2011).
Zheng et al., "CE2: Non-rectangular motion partitioning," Joint Collaborative Team on Video Coding (JCT-VC) of ITU-T SG16 WP3 and ISO/IEC JTC1/SC29/WG11, 6th Meeting, Torino, IT, JCTVC-F415, International Telecommunication Union, Geneva, Switzerland (Jul. 14-22, 2011).
Royce, "BoG report on CE2: Motion partitioning and OBMC," Joint Collaborative Team on Video Coding (JCT-VC) of ITU-T SG16 WP3 and ISO/IEC JTC1/SC29/WG11, 6th Meeting, Torino, IT, JCTVC-F751, International Telecommunication Union, Geneva, Switzerland (Jul. 14-22, 2011).
Zheng et al., "CE2: Summary report of core experiment on Motion Partitioning and OBMC," Joint Collaborative Team on Video Coding (JCT-VC) of ITU-T SG16 WP3 and ISO/IEC JTC1/SC29/ WG11, 7th Meeting, Geneva, CH, JCTVC-G032, International Telecommunication Union, Geneva, Switzerland (Nov. 21-30, 2011).
"Series H: Audiovisual and Multimedia Systems, Infrastructure of audiovisual services—Coding of moving video, Advanced video coding for generic audiovisual services," ITU-T H.264, pp. 1-807, International Telecommunication Union, Geneva, Switzerland (Feb. 2016).
Divorra et al., "Geometry-adaptive Block Partioning," ITU—Telecommunications Standardization Sector, Study Group 16 Question 6, Video Coding Experts Group (VCEG), No. VCEG-AF10, 32nd Meeting: San Jose, CA, XP030003531, pp. 1-8, International Telecommunication Union, Geneva, Switzerland (Apr. 20-21, 2007).
CN/201680087097, Search Report, dated Aug. 10, 2020.
Jäger et al., "CE3: Results on Depth-based Block Partitioning (DBBP),", Joint Collaborative Team on 3D Video Coding Extensions of ITU-T SG 16 WP 3 and ISO/IEC JTC 1/SC 29/WG 11,

(56) References Cited

OTHER PUBLICATIONS

JCT3V-G0106, 7th Meeting, San Jose, USA, pp. 1-12, International Telecommunication Union, Geneva, Switzerland (Jan. 11-17, 2013).

Jäger et al., "Encoder optimization: Motion estimation for DBBP with masked SAD instead of SATD," Joint collaborative Team on 3D Video Coding Extensions of ITU-T SG 16 WP 3 and ISO/IEC JTC 1/SC 29/WG 11, JCT3V-K0028, 11th Meeting, Geneva, CH, pp. 1-3, International Telecommunication Union, Geneva, Switzerland (Feb. 12-18, 2015).

Lin et al., "Removal of the decoder-side DBBP partition derivation process," Joint Collaborative Team on 3D Video Coding Extensions of ITU-T SG 16 WP 3 and ISO/IEC JTC 1/SC 29/WG 11, JCT3V-I0097, 9th Meeting, Sapporo, JP, pp. 1-7, International Telecommunication Union, Geneva, Switzerland (Jul. 3-9, 2014).

\* cited by examiner

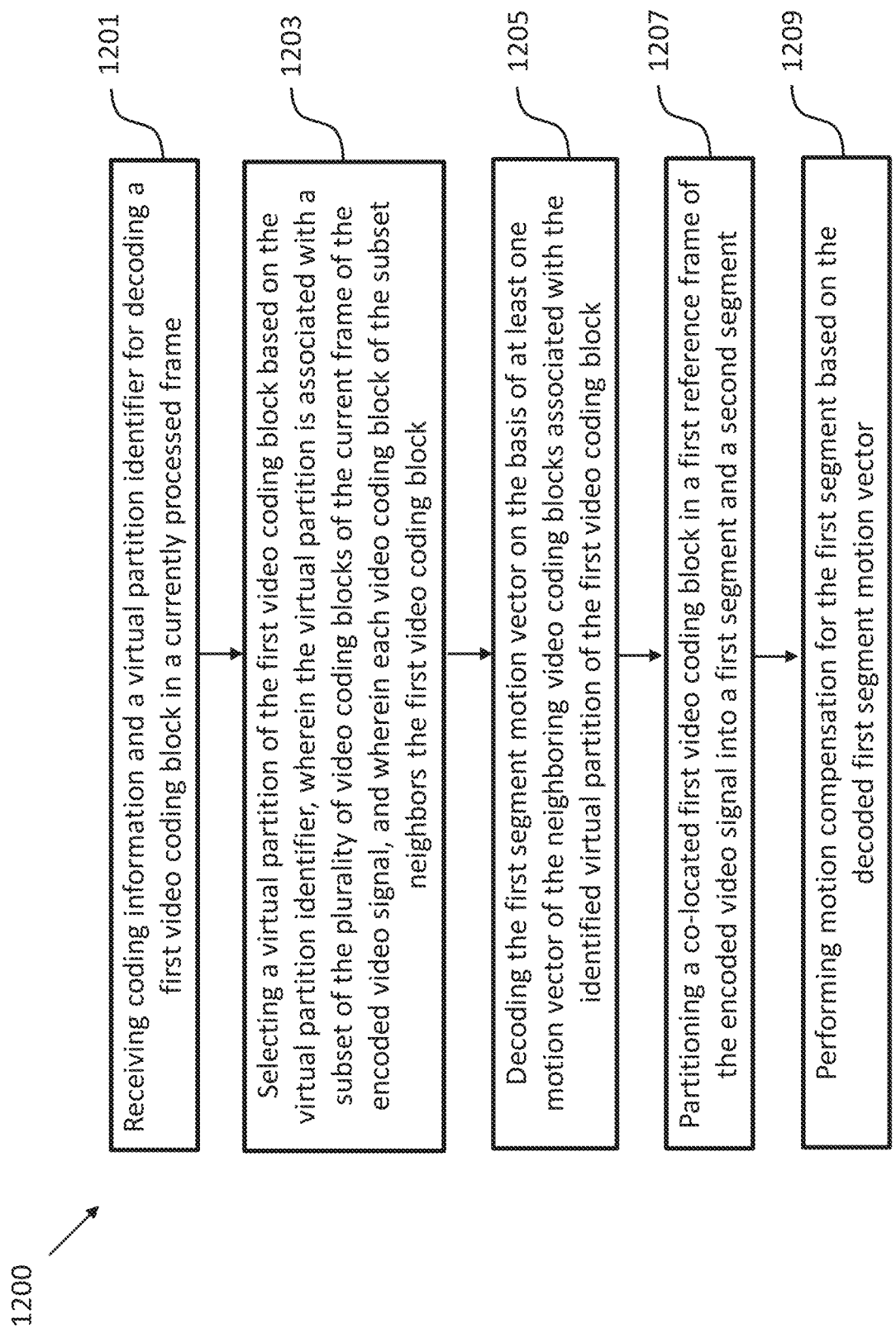

US 10,931,965 B2

DEVICES AND METHODS FOR VIDEO CODING USING SEGMENTATION BASED PARTITIONING OF VIDEO CODING BLOCKS

CROSS-REFERENCE TO RELATED APPLICATIONS

This application is a continuation of International Application No. PCT/EP2016/064707, filed on Jun. 24, 2016, the disclosure of which is hereby incorporated by reference in its entirety.

TECHNICAL FIELD

Generally, the present invention relates to the field of video coding. More specifically, the present invention relates to an apparatus for encoding and an apparatus for decoding a video signal using segmentation based partitioning of video coding blocks as well as corresponding methods.

BACKGROUND

In current video coding schemes, such as H.264/AVC ("Advanced Video Coding") or HEVC ("High Efficiency Video Coding"), the motion information in inter-predicted pictures (also referred to as frames) is partitioned into rectangular video coding blocks of configurable size. While in H.264/AVC the motion is partitioned into symmetric video coding blocks with a maximum size of 16×16 pixels, so-called macroblocks, which can be further subdivided down to a minimum of 4×4 pixels, HEVC replaces a macroblock with a coding tree unit (CTU) of maximum size 64×64 pixels. The CTU is not just a larger macroblock, as it can be partitioned in a quadtree (QT) decomposition scheme into smaller coding units (CU), which, in turn, can be subdivided down to a minimum size of 8×8 pixels. Furthermore, in comparison to H.264/AVC additionally HEVC supports asymmetric block partitioning (AMP) of coding units (CU) into prediction units (PU).

The determination of the decomposition and partitioning of each CTU is performed during the encoding process and is based on a rate-distortion optimization criterion. While AMP already provides an improved coding efficiency, problems in coding efficiency may arise along the boundaries of moving objects in a video sequence. Object boundaries that are not strictly vertical or horizontal may result in a fine quadtree decomposition and block partitioning along the object boundary. As the blocks along the boundary are expected to contain similar motion information, redundancy is introduced, which decreases the coding efficiency.

An attempt to address this problem is called geometric motion partitioning (GMP), which is based on the idea of partitioning a rectangular video coding block into two segments via a straight line, which can have practically any orientation. This approach provides for more flexibility in motion partitioning and therefore leads to a closer approximation of the actual motion. However, finding the optimal GMP of a video coding block in an exhaustive search, which greatly increases the computational complexity. Moreover, an efficient predictive coding scheme for the additional GMP information has to be provided.

In a more general and advanced partitioning approach, the video coding block containing an object boundary is partitioned into two (or more) segments along the actual object boundary, where the two or more segments carry coherent, yet different motion information. Due to the possible complexity of the shape of the boundary, coding the boundary and transmitting it as side information to the decoder is generally not an efficient option in terms of the data rate. This problem can be solved by determining the object boundary at the decoder (and encoder) side using already available information, e.g. from available reference pictures. Finding the correct object boundary is a typical problem in the field of image segmentation. Segmentation can be performed according to numerous image features, such as pixel luminance, chrominance, texture or a combination thereof.

An example for a segmentation based partitioning approach in the context of H.264/AVC is disclosed in WO2008150113. A reference block is used for obtaining the partition of a current block through coding of an additional motion vector.

WO2013165808 extends the segmentation based partitioning approach for video coding to scalable video coding.

WO2015007348 relates to depth based block partitioning (DBBP), which is used, for instance, as a coding tool in the 3D extensions of HEVC, and discloses the use of a depth map at the collocated position of a video coding block instead of a reference picture to obtain the appropriate segmentation.

In the context of 3D video coding, WO2015139762 discloses a method of determining the rectangular shape partitioning (virtual partitioning) representing the irregular shape partitioning defined by a binary segmentation mask based on depth information and a predefined decision rule that takes into account binary segmentation mask's values of preselected binary segmentation mask samples. The binary segmentation mask defines the irregular partitioning used by a depth based block partitioning (DBBP) coding tool, in which binary mask samples correspond to samples of the coded block. The selection of samples for deciding on the resultant rectangular shape partitioning that represents the input irregular shape partitioning (binary segmentation mask) is done according to a predefined selection pattern. Six available two-segment regular shape partitioning modes, which can be considered as virtual partitioning modes, are utilized by depth based block partitioning (DBBP) for video coding. The mapping of the binary segmentation mask to one of the six available two-segment partitioning modes is performed by comparing binary values of six samples in the binary segmentation mask.

Although the conventional approaches described above already provide some improvements compared to other prior art approaches, there is still a need for improved devices and methods for video coding using segmentation based partitioning of video coding blocks.

SUMMARY

It is an object of embodiments of the invention to provide improved devices and methods for video coding using segmentation based partitioning of video coding blocks.

The foregoing and other objects are achieved by the subject matter of the independent claims. Further implementation forms are apparent from the dependent claims, the description and the figures.

In order to describe the invention in detail, the following terms, abbreviations and notations will be used:
HEVC High-Efficiency Video Coding
CU Coding Unit
CTU Coding Tree Unit
PU Prediction Unit
PB Prediction Block
MV Motion Vector GMP Geometric Motion Partitioning
SBP Segmentation Based Partitioning
AMP Asymmetric Motion Partitioning As used herein, a video signal or video sequence is a set of subsequent frames presenting a motion picture. In other words, a video signal or video sequence consists of a plurality of frames (also referred to as pictures).

As used herein, segmentation is the process of partitioning a picture or picture region, in particular a video coding block, into two or more segments.

As used herein, coding tree unit (CTU) denotes the root of a coding structure of the video sequence of a pre-defined size, containing a part of a frame (e.g. 64×64 pixels). A CTU can be partitioned into several CUs.

As used herein, coding unit (CU) denotes a basic coding structure of the video sequence of a pre-defined size, containing a part of a frame, which is belonging to a CTU. A CU can be partitioned into further CUs.

As used herein, prediction unit (PU) denotes a coding structure, which is the result of partitioning of a CU.

As used herein, the term co-located in the present document denotes a block or region in a second frame, i.e. a reference frame, corresponding to an actual block or region in a first frame, i.e. a current frame.

The devices and method described herein may be used for representing motion information for segmentation based block partitioning, used in conjunction with rectangular block partitioning, which is useful for inter-prediction in video coding applications.

The devices and methods described herein may be used for inter prediction between pictures to exploit the temporal redundancy of natural video sequences. The change of information observed between the current picture and a reference picture can often be approximated by translational movement, e.g. linear movement within the image plane. Block based motion compensation is the dominating realization of this paradigm, where a reference picture is partitioned into rectangular blocks and each pixel within a block is exhibiting the same motion. Thus, the movement of the entire block, called the prediction block, can be described by a single motion vector. The set of motion vectors over the whole reference picture is denoted as a motion vector field. Depending on the temporal location and number of reference pictures associated with the motion vector field, one can further distinguish between uni- and bi-prediction. Further, if two motion vectors are associated with the same spatial position within the prediction block, the concept of weighted prediction is introduced.

The devices and methods described herein can exploit the redundancy, both spatially and temporally, exhibited by the motion vector field. If motion is mostly coherent within a region of a picture, the motion vector of a block can be predicted from its neighbouring blocks and only a motion vector difference needs to be transmitted, depending on the rate-distortion operating point of the encoder. The selection of appropriate motion vector predictor candidates is also performed at the encoder and subject to a rate-distortion optimization.

According to a first aspect the invention relates to an apparatus for encoding a video signal, wherein the video signal comprises a plurality of frames and each frame is dividable into a plurality of video coding blocks. The apparatus comprises a partitioner configured to partition a first video coding block of the plurality of video coding blocks of a current frame of the video signal into at least a first segment and a second segment, wherein the first segment is associated with a first segment motion vector relative to a reference frame of the video signal. The first video coding block is associated with a plurality of pre-defined virtual partitions of the first video coding block and each virtual partition is associated with a respective subset of the plurality of video coding blocks of the current frame of the video signal, wherein each video coding block of the respective subset neighbors the first video coding block and is associated with a respective neighboring block motion vector. The apparatus further comprises an encoding processor configured to encode, for each of the virtual partitions, the first segment motion vector on the basis of at least one motion vector of the neighboring video coding blocks associated with the selected virtual partition for encoding the first coding block, and a selector configured to select the virtual partition of the first video coding block on the basis of a respective performance measure associated with the encoding of the first segment motion vector, and to generate a virtual partition identifier identifying the virtual partition selected by the selector and coding information including the encoded first segment motion vector.

Thus, an improved encoding apparatus for video coding is provided using segmentation based partitioning of video coding blocks.

In a first possible implementation form of the apparatus according to the first aspect as such, the selector is configured to select the virtual partition of the first video coding block on the basis of a respective rate distortion measure associated with the encoding of the first segment motion vector, in particular by minimizing the rate distortion measure.

In a second possible implementation form of the apparatus according to the first aspect as such or the first implementation form thereof, the encoding processor is configured to encode the first segment motion vector on the basis of at least one motion vector of the neighboring video coding blocks associated with the selected virtual partition of the first video coding block and at least one motion vector of a co-located video coding block in a temporally neighboring frame of the video signal.

In a third possible implementation form of the apparatus according to the first aspect as such or the first or second implementation form thereof, the encoding processor is configured to encode the virtual partition identifier along with the first video coding block.

In a fourth possible implementation form of the apparatus according to the first aspect as such or any one of the first to third implementation form thereof, a boundary motion vector is associated with a boundary between the first segment and the second segment of the first video coding block, wherein the encoding processor is configured to encode the boundary motion vector on the basis of the first segment motion vector and/or on the basis of a second segment motion vector associated with the second segment.

In a fifth possible implementation form of the apparatus according to the fourth implementation form of the first aspect, the encoding processor is configured to encode the boundary motion vector by rescaling a first segment motion vector of the co-located video coding block in a reference frame.

In a sixth possible implementation form of the apparatus according to the first aspect as such or any one of the first to fifth implementation form thereof, the encoding processor is configured to encode the first segment motion vector on the basis of at least one motion vector of the neighboring video coding blocks associated with the selected virtual partition of the first video coding block using motion vector merging.

In a seventh possible implementation form of the apparatus according to the first aspect as such or any one of the first to sixth implementation form thereof, the set of predefined virtual partitions of the first video coding block comprises the partitions 2N×N, N×2N, 2N×nU, 2N×nD, nL×2N and nR×2N of the first video coding block.

According to a second aspect the invention relates to a method for encoding a video signal, wherein the video signal comprises a plurality of frames and each frame is dividable into a plurality of video coding blocks. The method comprises a first step of partitioning a first video coding block of the plurality of video coding blocks of a current frame of the video signal into at least a first segment and a second segment, wherein the first segment is associated with a first segment motion vector relative to a reference frame of the video signal, wherein the first video coding block is associated with a plurality of predefined virtual partitions of the first video coding block, and each virtual partition is associated with a respective subset of the plurality of video coding blocks of the current frame of the video signal, wherein each video coding block of the respective subset neighbors the first video coding block and is associated with a neighboring block motion vector. The method comprises a further step of encoding, for each of the virtual partitions, the first segment motion vector on the basis of at least one neighboring block motion vector of the neighboring video coding blocks associated with the selected virtual partition of the first video coding block. The method comprises a further step of selecting the virtual partition of the first video coding block on the basis of a respective performance measure associated with the encoding of the first segment motion vector and generating a virtual partition identifier identifying the selected virtual partition and coding information including the encoded first segment motion vector.

Thus, an improved encoding method for video coding is provided using segmentation based partitioning of video coding blocks.

The method according to the second aspect of the invention can be performed by the apparatus according to the first aspect of the invention. Further features and implementation forms of the method according to the second aspect of the invention result directly from the functionality of the apparatus according to the first aspect of the invention and its different implementation forms.

Specifically, in a first possible implementation form of the method according to the second aspect as such, wherein the virtual partition of the first video coding block is selected, by a selector, on the basis of a respective rate distortion measure associated with the encoding of the first segment motion vector, in particular by minimizing the rate distortion measure.

In a second possible implementation form of the method according to the second aspect as such or the first implementation form thereof, the first segment motion vector is encoded, by an encoding processor, on the basis of at least one motion vector of the neighboring video coding blocks associated with the selected virtual partition of the first video coding block and at least one motion vector of a co-located video coding block in a temporally neighboring frame of the video signal.

In a third possible implementation form of the method according to the second aspect as such or the first or second implementation form thereof, the virtual partition identifier is encoded, by the encoding processor, along with the first video coding block.

In a fourth possible implementation form of the method according to the second aspect as such or any one of the first to third implementation form thereof, a boundary motion vector is associated with a boundary between the first segment and the second segment of the first video coding block, wherein the boundary motion vector is encoded, by the encoding processor, on the basis of the first segment motion vector and/or on the basis of a second segment motion vector associated with the second segment.

In a fifth possible implementation form of the method according to the fourth implementation form of the second aspect, the boundary motion vector is encoded, by the encoding processor, by rescaling a first segment motion vector of the co-located video coding block in a reference frame.

In a sixth possible implementation form of the method according to the second aspect as such or any one of the first to fifth implementation form thereof, the first segment motion vector is encoded, by the encoding processor, on the basis of at least one motion vector of the neighboring video coding blocks associated with the selected virtual partition of the first video coding block using motion vector merging.

In a seventh possible implementation form of the method according to the second aspect as such or any one of the first to sixth implementation form thereof, the set of predefined virtual partitions of the first video coding block comprises the partitions 2N×N, N×2N, 2N×nU, 2N×nD, nL×2N and nR×2N of the first video coding block.

According to a third aspect the invention relates to an apparatus for decoding an encoded video signal, wherein the encoded video signal comprises a plurality of frames and each frame is dividable into a plurality of video coding blocks. The apparatus comprises a decoding processor configured to receive coding information and a virtual partition identifier for decoding a first video coding block in a current frame, select a virtual partition of the first video coding block based on the virtual partition identifier, wherein the virtual partition is associated with a subset of the plurality of video coding blocks of the current frame of the encoded video signal, and wherein each video coding block of the subset neighbors the first video coding block, and decode the first segment motion vector on the basis of at least one motion vector of the neighboring video coding blocks associated with the identified virtual partition of the first video coding block. The apparatus further comprises a partitioner configured to partition a co-located first video coding block in a first reference frame of the encoded video signal into at least a first segment and a second segment, wherein the decoding processor is further configured to perform motion compensation for the first segment based on the decoded first segment motion vector.

Thus, an improved decoding apparatus for video coding is provided using segmentation based partitioning of video coding blocks.

In a first possible implementation form of the apparatus according to the third aspect as such, the decoding processor is configured to decode the first segment motion vector on the basis of at least one motion vector of the neighboring video coding blocks associated with the virtual partition of the first video coding block and at least one motion vector of a video coding block in a temporally neighboring frame of the encoded video signal.

In a second possible implementation form of the apparatus according to the third aspect as such or its first implementation form, the decoding processor is configured to decode the first segment motion vector on the basis of at least one motion vector of the neighboring video coding blocks associated with the virtual partition of the first video coding block using motion vector merging.

In a third possible implementation form of the apparatus according to the third aspect as such or its first or second implementation form, the virtual partition of the first video coding block is one of the following partitions: a 2N×N, N×2N, 2N×nU, 2N×nD, nL×2N or nR×2N partition of the first video coding block.

In a fourth possible implementation form of the apparatus according to the third aspect as such or any one of its first to third implementation form, the decoding processor is configured to decode a boundary motion vector associated with a boundary between the first segment and the second segment on the basis of the first segment motion vector and the partitioner is configured to partition the co-located first video coding block in the first reference frame of the encoded video signal into the first segment and the second segment on the basis of the decoded boundary motion vector.

According to a fourth aspect the invention relates to a method for decoding an encoded video signal, wherein the encoded video signal comprises a plurality of frames and each frame is dividable into a plurality of video coding blocks. The method comprises the steps of: receiving coding information and a virtual partition identifier for decoding a first video coding block in a current frame; selecting a virtual partition of the first video coding block based on the virtual partition identifier, wherein the virtual partition is associated with a subset of the plurality of video coding blocks of the current frame of the encoded video signal and wherein each video coding block of the subset neighbors the first video coding block; decoding the first segment motion vector on the basis of at least one motion vector of the neighboring video coding blocks associated with the identified virtual partition of the first video coding block; partitioning a co-located first video coding block in a first reference frame of the encoded video signal into at least a first segment and a second segment; and performing motion compensation for the first segment based on the decoded first segment motion vector.

Thus, an improved decoding method for video coding is provided using segmentation based partitioning of video coding blocks.

The method according to the fourth aspect of the invention can be performed by the apparatus according to the third aspect of the invention. Further features and implementation forms of the method according to the fourth aspect of the invention result directly from the functionality of the apparatus according to the third aspect of the invention and its different implementation forms.

In a first possible implementation form of the method according to the fourth aspect as such the first segment motion vector is decoded, by a decoding processor, on the basis of at least one motion vector of the neighboring video coding blocks associated with the virtual partition of the first video coding block and at least one motion vector of a video coding block in a temporally neighboring frame of the encoded video signal.

In a second possible implementation form of the method according to the fourth aspect as such or its first implementation form, the first segment motion vector is decoded, by the decoding processor, on the basis of at least one motion vector of the neighboring video coding blocks associated with the virtual partition of the first video coding block using motion vector merging.

In a third possible implementation form of the method according to the fourth aspect as such or its first or second implementation form, the virtual partition of the first video coding block is one of the following partitions: a 2N×N, N×2N, 2N×nU, 2N×nD, nL×2N or nR×2N partition of the first video coding block.

In a fourth possible implementation form of the method according to the fourth aspect as such or any one of its first to third implementation form, a boundary motion vector associated with a boundary between the first segment and the second segment is decoded, by the decoding processor, on the basis of the first segment motion vector and the partitioner is configured to partition the co-located first video coding block in the first reference frame of the encoded video signal into the first segment and the second segment on the basis of the decoded boundary motion vector.

According to a fifth aspect the invention relates to a computer program comprising program code for performing the method according to the third aspect or the fourth aspect when executed on a computer.

The invention can be implemented in hardware and/or software.

BRIEF DESCRIPTION OF THE DRAWINGS

Further embodiments of the invention will be described with respect to the following figures, wherein:

FIG. 12 shows a schematic diagram illustrating a method for decoding a video signal according to an embodiment.

In the various figures, identical reference signs will be used for identical or at least functionally equivalent features.

DETAILED DESCRIPTION OF EMBODIMENTS

In the following description, reference is made to the accompanying drawings, which form part of the disclosure, and in which are shown, by way of illustration, specific aspects in which the present invention may be placed. It is understood that other aspects may be utilized and structural or logical changes may be made without departing from the scope of the present invention. The following detailed description, therefore, is not to be taken in a limiting sense, as the scope of the present invention is defined be the appended claims.

For instance, it is understood that a disclosure in connection with a described method may also hold true for a corresponding device or system configured to perform the method and vice versa. For example, if a specific method step is described, a corresponding device may include a unit to perform the described method step, even if such unit is not explicitly described or illustrated in the figures. Further, it is understood that the features of the various exemplary aspects described herein may be combined with each other, unless specifically noted otherwise.

Figure 1:
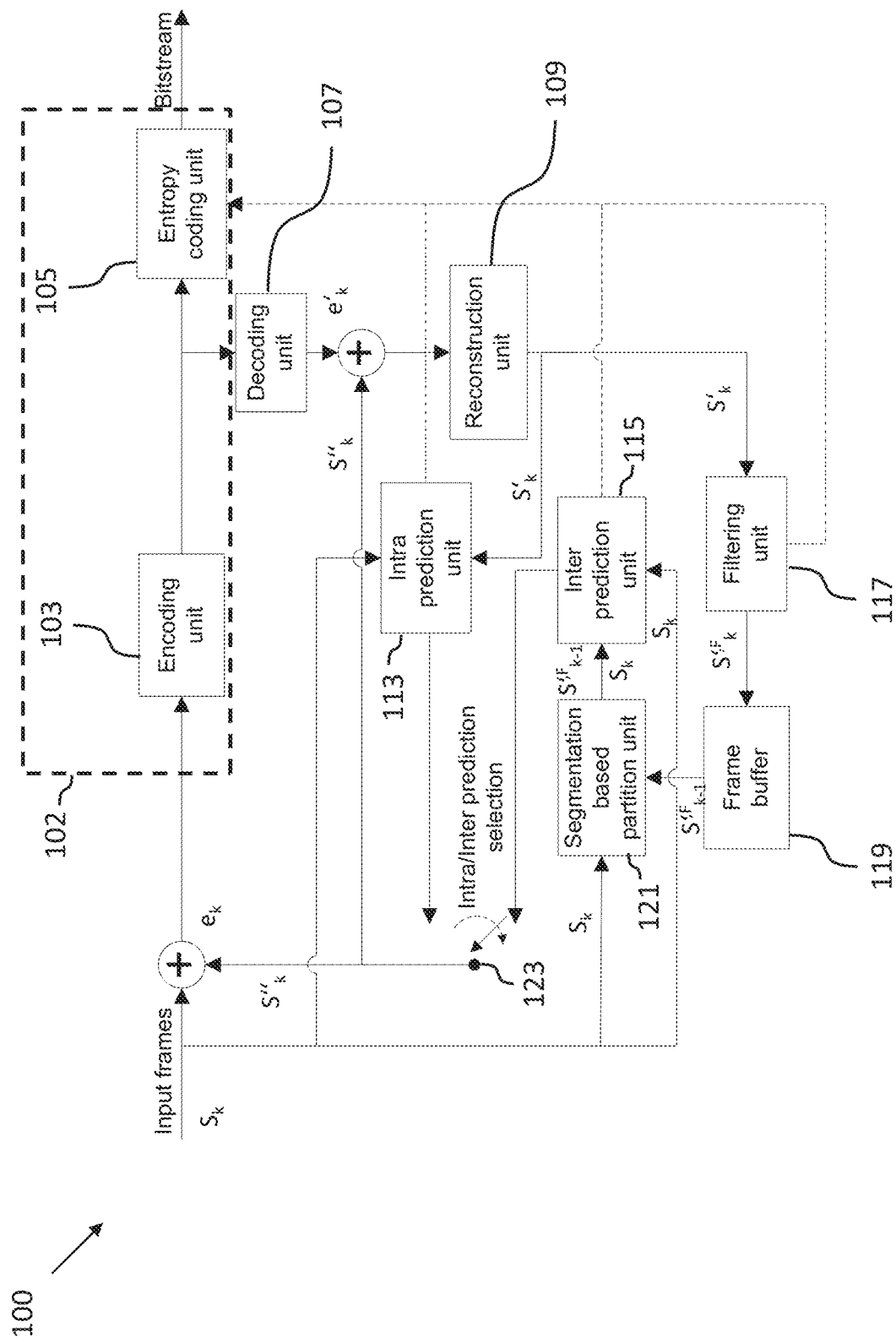
FIG. 1 shows a schematic diagram illustrating an apparatus for encoding a video signal according to an embodiment.

FIG. 1 shows a schematic diagram illustrating an apparatus 100 for encoding a video signal according to an embodiment. The apparatus 100 is configured to encode a video signal comprising a plurality of frames (also referred to herein as pictures), wherein each frame is dividable into a plurality of video coding blocks and each video coding block comprises a plurality of pixels. In an embodiment, the video coding blocks could be macro blocks, coding tree units, coding units, prediction units and/or prediction blocks.

The apparatus 100 comprises a partitioner 121, which in the embodiment shown in FIG. 1 is implemented in the form of a segmentation based partition unit 121, configured to partition a first video coding block of the plurality of video coding blocks of a current frame of the video signal into at least a first segment and a second segment.

Figure 4:
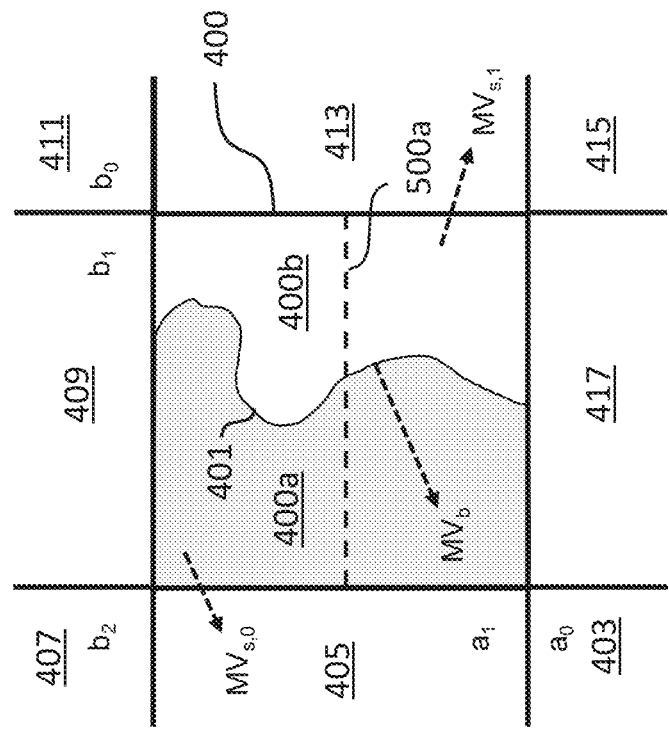
FIG. 4 shows a schematic diagram illustrating different aspects of a segmentation based partitioning approach implemented in embodiments of the invention.

FIG. 4 shows a portion of a currently processed frame of a video signal comprising a first video coding block 400. The first video coding block 400 is divided by a boundary 401 into a first segment 400a comprising a first set of the plurality of pixels of the first video coding block 400 and a second segment 400b comprising a second complimentary set of the plurality of pixels of the first video coding block 400. As indicated in FIG. 4, the first segment 400a is associated with a first segment motion vector $MV_{s,0}$ relative to a reference frame of the video signal and the second segment is associated with a second segment motion vector $MV_{s,1}$ relative to the same or another reference frame of the video signal. Moreover, the boundary 401 is associated with a boundary motion vector $MV_b$. Moreover, FIG. 4 shows a possible virtual partition 500a of the first video coding block 400, which will be described in more detail further below.

Figure 5:
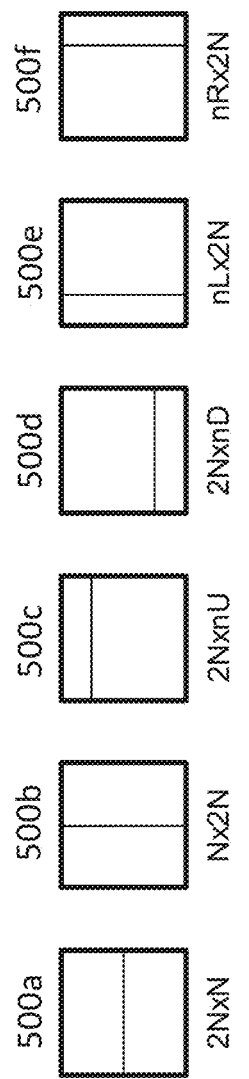
FIG. 5 shows a schematic diagram illustrating possible virtual partitions of a video coding block used in a segmentation based partitioning approach implemented in embodiments of the invention.

According to an embodiment of the present invention, the first video coding block 400 is associated with a plurality of predefined virtual partitions 500a-f of the first video coding block 400. In other words: the first video coding block 400 can be partitioned virtually, i.e. for computational purposes, which will be described in more detail further below, using a plurality of predefined, in particular rectangular virtual partitions 500a-f. FIG. 5 shows an exemplary set of rectangular virtual partitions that can be associated with the first video coding block 400. Each virtual partition 500a-f is associated with a respective subset of the plurality of video coding blocks of the current frame of the video signal, wherein each video coding block of the respective subset neighbors the first video coding block 400 and is associated with a respective motion vector.

For instance, in the example shown in FIG. 4 the virtual partition 500a could be associated with the video coding blocks 403, 405, 407, 409, 411, which are neighbors of the first video coding block 400, as indicated by the letters $a_0$, $a_1$, $b_2$, $b_1$ and $b_0$.

The apparatus 100 further comprises an encoding processor 102, which in the embodiment shown in FIG. 1 is implemented in the form of an entropy coding unit 105 and an encoding unit 103, configured to encode, for each of the virtual partitions 500a-f, the first segment motion vector $MV_{s,0}$ on the basis of at least one motion vector of one of the neighboring video coding blocks associated with the selected virtual partition 500a-f for encoding the first video coding block 400. It will be clear that encoding motion vectors in the context of certain embodiments of the present invention includes encoding a difference of the current motion vector and a corresponding reference motion vector, as conventionally done in the art.

The grouping of the blocks of FIG. 1 into larger functional units (such as the encoding processor) is indicative and for ease of reference and it will be clear that a different choice of the blocks comprised in the encoding processor would not affect the function of the apparatus 100. For example, in the apparatus 100, the encoding processor may also include the inter prediction unit 115 in addition to the entropy coding unit 105 and an encoding unit 103. Same holds also true for the apparatus 200 described later.

Moreover, the apparatus 100 further comprises a selector 115, which in the embodiment shown in FIG. 1 is implemented in the form or as part of an inter prediction unit 115, configured to select out of the set of predefined virtual partitions 500a-f of the first video coding block 400 that virtual partition of the plurality of predefined virtual partitions 500a-f of the first video coding block 400, which provides the best encoding results with respect to a predefined performance measure. In an embodiment, the selector 115 is configured to select the best-performing virtual partition 500a-f on the basis of a rate-distortion criterion, in particular a rate-distortion ratio.

The selector 115, moreover, is configured to generate a virtual partition identifier identifying the virtual partition 500a-f, which has been selected by the selector 115 on the basis of the performance measure, in particular a rate-distortion criterion, and to generate coding information including the encoded first segment motion vector $MV_{s,0}$.

In hybrid video coding the first frame of a video signal is generally an intra frame, which can be encoded using only intra prediction. An intra prediction unit 113 of the apparatus 100 shown in FIG. 1 can perform the processes for intra prediction. An intra frame can be decoded without referencing information from other frames. The video coding blocks of the frames following the first frame can be inter or intra coded. An intra/inter prediction selection unit 123 of the apparatus shown in FIG. 1 can select between intra and inter coding.

The inter prediction unit 115 of the apparatus 100 shown in FIG. 1 can perform such operations as motion estimation, motion compensation for choosing motion data including the selected reference picture, motion vector, partitioning, mode decision and other information, as will be described in more detail further below in the context of FIG. 3.

As already mentioned above, the generally rectangular video coding blocks, such as the video coding block 400, are partitioned by the segmentation based partition unit 121 into two or more respective segments having irregular (or arbitrary) shapes, namely a first segment 400a comprising a first set of the plurality of pixels of the video coding block 400 and a second segment 400b comprising a second set of the plurality of pixels of the video coding block 400, which in case of two segments is generally complementary to the first set of the plurality of pixels of the video coding block 400. As already mentioned above, the first segment 400a and the second segment 400b define a boundary 401 between each other.

In the embodiment shown in FIG. 1, the prediction error of the intra/inter picture prediction $e_k$, which is the difference between the original video coding block $S_k$ and its prediction $S''_k$, can be encoded by the encoding unit 103 of the apparatus 100, which can perform such processes as transform, transform skip, scaling, quantization and the like. The output of the encoding unit 103 as well as the side-information provided by the intra prediction unit 113, the inter prediction unit 115 and/or the filtering unit 117 can be further encoded by the entropy coding unit 105 of the apparatus 100.

In the embodiment shown in FIG. 1, the apparatus 100 for encoding a video signal duplicates the processing of a corresponding apparatus 200 for decoding a video signal, which will be described in more detail further below in the context of FIG. 2, such that both the encoding apparatus 100 and the decoding apparatus 200 will generate the same predictions. The decoding unit 107 of the encoding apparatus 100 shown in FIG. 1 is configured to perform operations inverse to the operations of the encoding unit 103 and duplicates the decoded approximation of the prediction error/residual data $e'_k$. The decoded prediction error/residual data $e'_k$ is then added to the results of the prediction $S''_k$. A reconstruction unit 109 of the apparatus 100 obtains the results of adding the residual to the prediction $S''_k$ to obtain a reconstructed frame $S'''_k$. In an embodiment, the output of the reconstruction unit 109 can be optionally further processed by one or more filters implemented in a filtering unit 117 to generate a processed signal $S'''^F_k$, in which for example coding artifacts are smoothed. The reconstructed frame or the filtered reconstructed frame may be stored in a frame buffer 119 and used as reference frame for the motion compensated prediction performed in the inter prediction units or intra prediction units. In addition, the inter prediction unit 115 may further receive an input frame $S_k$. The input frame and the reconstructed frame or the filtered reconstructed frame may be input to the inter prediction unit directly or through the segmentation based partition unit 121.

The final picture is stored in a frame buffer 119 of the encoding apparatus 100 and can be used for the prediction of subsequent frames of the video signal. In an embodiment, the segmentation based partition unit 121 can perform the steps of object boundary based partition including possible pre- and post-processing. The segmentation based partition unit 121 is configured to adaptively generate a segmentation for the current block from the reference pictures/frames. Segmentation related parameters can be encoded and transmitted as side-information to the decoding apparatus 200. As an example, side-information may be input from the segmentation based partition unit 121 to the inter prediction unit 115 and from the inter prediction unit 115 to the entropy coding unit 105 (dashed lines in FIG. 1). Alternatively, side-information may be input directly from the segmentation based partition unit 121 into the entropy coding unit 105 (not shown). The side-information may be then transmitted to a decoding apparatus 200 along with the encoded video signal. Alternatively, the side information may be coded in the video signal to be transmitted as bitstream to the decoding apparatus 200.

Figure 2:
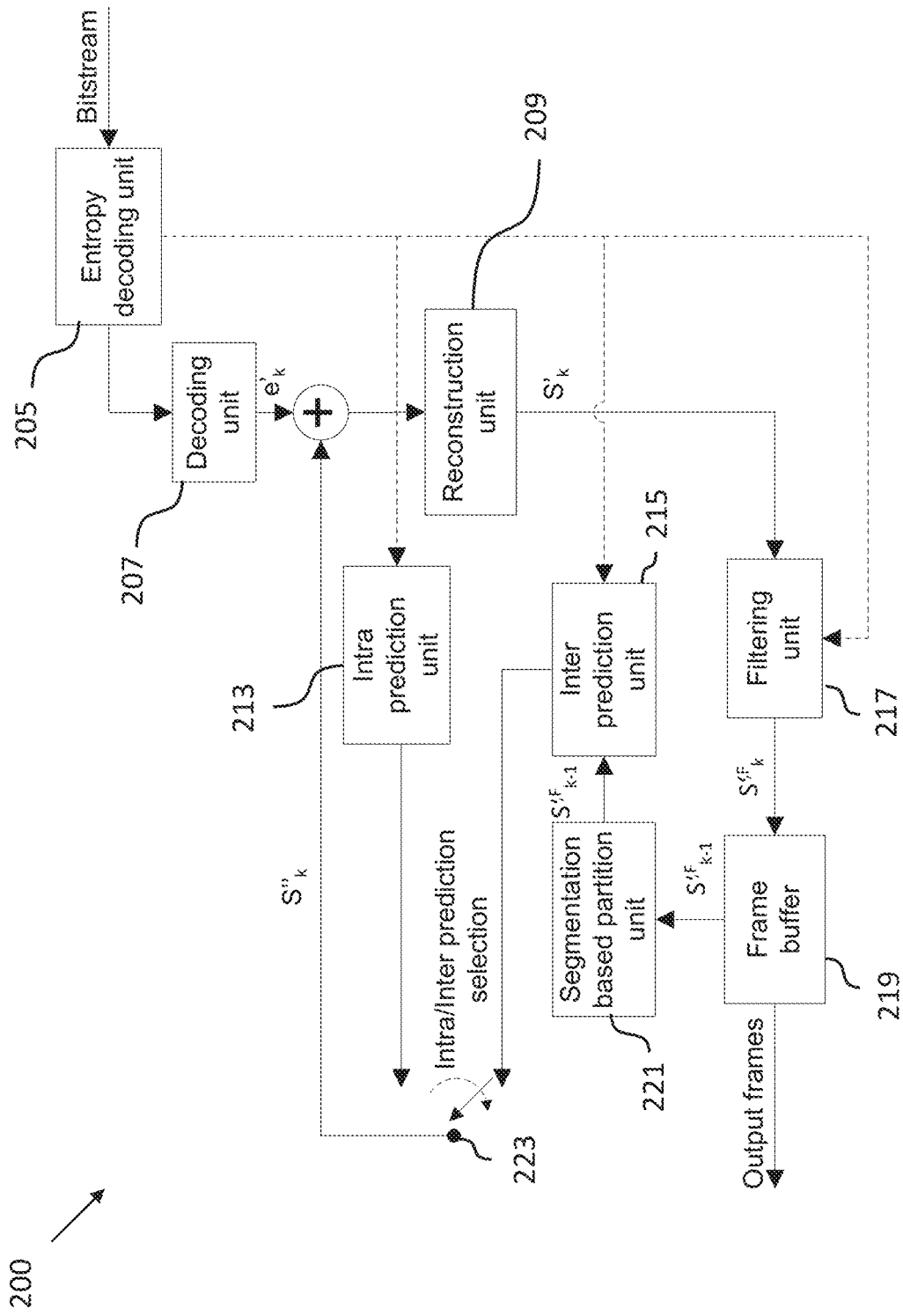
FIG. 2 shows a schematic diagram illustrating an apparatus for decoding an encoded video signal according to an embodiment.

FIG. 2 shows a schematic diagram illustrating an apparatus 200 for decoding a video signal according to an embodiment, in particular a video signal encoded by the encoding apparatus 100 shown in FIG. 1.

The apparatus 200 comprises a decoding processor, which in the embodiment shown in FIG. 2 is implemented in the form of an entropy decoding unit 205 a decoding unit 207 and an inter prediction unit 215 and is configured to receive coding information and a virtual partition identifier, for instance from the encoding apparatus 100 shown in FIG. 1, for decoding a first video coding block in a currently processed frame of the video signal, for instance the first video coding block 400 shown in FIG. 4.

After the decoding process is done by the decoding processor, the inter prediction unit 215 of the apparatus 200 is further configured to select a virtual partition 500a-f of the first video coding block 400 based on the virtual partition identifier, wherein the virtual partition 500a-f is associated with a subset of the plurality of video coding blocks of the currently processed frame of the encoded video signal and wherein each video coding block of the subset neighbors the first video coding block 400.

Moreover, the apparatus 200 is configured to decode the first segment motion vector $MV_{s,0}$ on the basis of at least one motion vector of the neighboring video coding blocks associated using the virtual partition 500a-f of the first video coding block 403 identified by the virtual partition identifier. It will be clear that decoding motion vectors in the context of embodiments of the present invention includes decoding, at the entropy decoding unit a difference of the current motion vector and a corresponding reference motion vector, as conventionally done in the art. The decoded difference can be input to the inter prediction unit 215 (dashed line going form the entropy decoding unit to the inter prediction unit in FIG. 2) to generate a decoded motion vector.

The apparatus 200 further comprises a partitioner 221, which in the embodiment shown in FIG. 2 is implemented in the form of a segmentation based partition unit 221, configured to partition a co-located first video coding block in a reference frame of the encoded video signal into a first segment and a second segment based on the decoded boundary motion vector.

The decoding processor of the apparatus 200 is further configured to perform motion compensation for the first segment based on the decoded first segment motion vector. Generally, motion compensation is an algorithmic technique used to predict a frame of a video signal, given the previous and/or future frames by accounting for motion of the camera and/or objects in the video.

In the embodiment shown in FIG. 2, the entropy decoding unit 205 is configured to perform entropy decoding of the prediction errors, motion data and other side information, which are needed by additional components of the decoding apparatus 200, in particular the intra prediction unit 213, the inter prediction unit 215, the segmentation based partition unit 221 and/or the filtering unit 217. The operations of the intra prediction unit 213, the inter prediction unit 215, the intra/inter prediction selection unit 223, the segmentation based partition unit 221 and the filtering unit 217 are essentially identical to the operations performed by the corresponding components of the encoding apparatus 100 shown in FIG. 1, namely the intra prediction unit 113, the inter prediction unit 115, the intra/inter prediction selection unit 123, the segmentation based partition unit 121 and the filtering unit 117, which already have been described above in the context of FIG. 1. This is to ensure that identical predictions can be generated both by encoding apparatus 100 as well as by the decoding apparatus 200.

Figure 3:
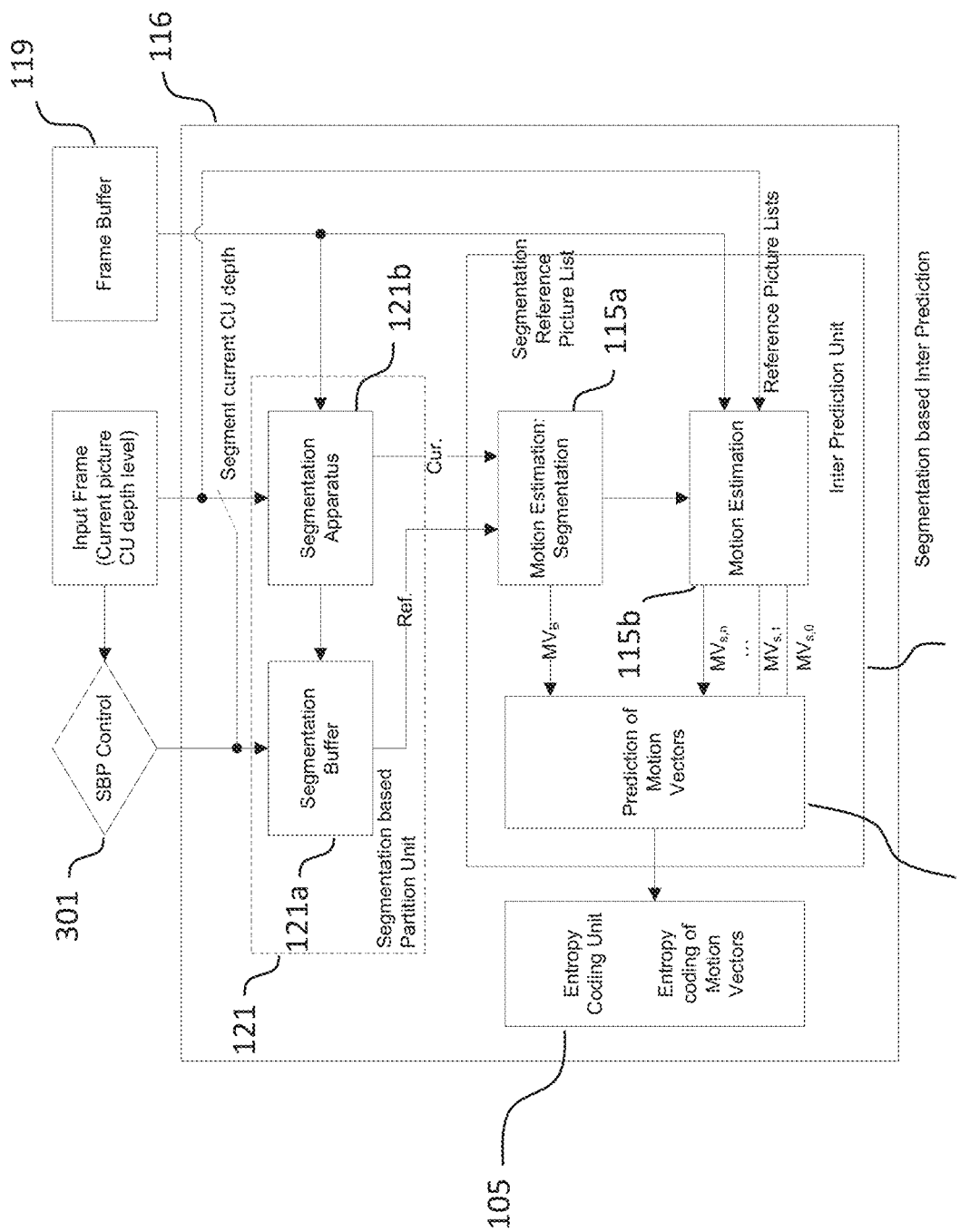
FIG. 3 shows a schematic diagram illustrating a more detailed view of components of the apparatus of FIG. 1 or the apparatus of FIG. 2 according to an embodiment.

FIG. 3 shows a more detailed illustration of the functional blocks of the encoding apparatus 100 and the decoding apparatus 200, which implement the segmentation based partitioning according to embodiments of the invention. In the embodiment shown in FIG. 3, the segmentation based partition unit 121 comprises a segmentation buffer 121a and a segmentation apparatus 121b and the inter prediction unit 115 comprises a block "Motion Estimation: Segmentation" 115a, a block "Motion Estimation" 115b and a block "Prediction of Motion Vectors" 115c. As already mentioned above, these blocks can be implemented in the inter prediction unit 215 and the segmentation based partition unit 221 of the decoding apparatus 200 as well. As one will appreciate, some other typical components that might be present in modern hybrid video codecs, such as the transform coding and entropy coding blocks, have not been explicitly specified in FIG. 3 for the sake of clarity.

In the embodiment shown in FIG. 3, a SBP control block 301 is configured to determine in a first step whether segmentation is performed for the current quad-tree depth level. In an embodiment, the SBP control block 301 is configured to check at a current depth level k whether segmentation shall be performed for all depth levels and whether the depth is not larger than a threshold depth kMaxDepth. While in the implementation described in FIG. 3 the SBP control block 301 is depicted as an independent block connected upstream of the segmentation based partition unit 121, the functionality of such block may also be implemented within the segmentation based partition unit 121. In such a case, no independent block needs to be indicated, as for instance illustrated in FIGS. 1 and 2.

If this is the case, then in a second step the picture region associated with the currently processed video coding block can be segmented into a binary mask and stored in a segmentation buffer 121a of the segmentation based partition unit 121. Otherwise, i.e. if one of the conditions checked by the SBP control block 301 is not fulfilled, the segmented picture region associated with depth level k−1 can be loaded from the segmentation buffer 121a and processing continues at step 6 (described later on in the description).

In a third step the segmentation, including all possible steps of pre- and post-processing, can be performed by a segmentation apparatus 121b of the segmentation based partition unit 121. Segmentation related parameters can be encoded and transmitted as side-information to the decoding apparatus 200. As described above with reference to the encoding apparatus, segmentation related parameters may be transmitted to the decoding apparatus 200 in a bitstream along with an encoded video signal. Alternatively, the segmentation related parameters may be coded in the video signal to be transmitted as bitstream to the decoding apparatus 200.

In a fourth step, for every reference picture (or reference frame) belonging to the segmentation reference picture list, which is associated with the current picture (or frame), a boundary motion vector $MV_b$ can be estimated according to the following steps 5 and 6. In an embodiment, the displacement vector $MV_b$ can be selected on the basis of a rate-distortion cost criterion.

In a fifth step, a picture region of a reference picture at the co-located position of the currently processed video coding block is analyzed, where the size of the picture region can depend on a configurable search window size and the size of the currently processed video coding block. The picture region is segmented according to above step 3.

In a sixth step, motion estimation can be performed for the current segmented picture region and the segmented reference picture region, resulting in the boundary displacement vector $MV_b$.

In a seventh step, steps 5 and 6 can be repeated for all reference pictures in the reference picture list. After the optimal displacement vector has been found, the segmented reference picture region can be motion compensated using the boundary displacement vector and stored in the segmentation buffer 121a of the segmentation based partition unit 121. The selected segmentation reference picture can be associated with a reference picture index, which is being transmitted as side information to the decoding apparatus 200.

In an eighth step, a segment-wise motion estimation can be performed on the currently processed video coding block using the compensated, segmentation mask for each of the segments, resulting in one motion vector per segment. Motion estimation can be performed in a uni- and bi-directional manner as well as using a weighted prediction scheme.

In a ninth step, the motion vectors of the segments can be predicted. And finally, the boundary motion vector can be predicted.

As already described above, according to embodiments of the invention two distinct types of motion vectors can be predicted, namely the motion vector relating to a segment, for instance the motion vectors $MV_{s,0}$ and $MV_{s,1}$ in FIG. 4 associated with the first segment 400a and the second segment 400b, respectively, and the boundary motion vector $MV_b$, which can locate the segmentation or boundary 401 in a segmentation reference picture.

In an embodiment, for both types of motion vectors different predictor candidate lists can be compiled. In an embodiment, the candidate list of segment motion vector predictors is compiled according to the selected virtual partition 500a-f of the currently processed video coding block 400. A rectangular virtual partition 500a-f is chosen in order to generate an optimal list of motion vector predictor candidates. Thus, according to embodiments of the present invention, the segmentation mask or a correlation analysis is not used for determining the virtual partition 500a-f. As already described above, the virtual partition 500a-f is chosen, for instance, based on a rate distortion optimization. For this purpose any method for identifying which virtual partition results in the optimal rate distortion may be used. As an example, the virtual partition may be selected, for which the rate distortion measure is minimized. In an embodiment, the total number of virtual partitions 500a-f to be tested can be derived from the set of available modes for regular, block based partitioning. In contrast, in an embodiment, the candidate list for prediction of the boundary motion vector consists of the segment motion vectors.

As already described above, FIG. 5 shows an exemplary set of virtual partitions 500a-f, namely horizontal and vertical block based virtual partitions. These virtual partitions can be symmetric virtual partitioning (2N×N, N×2N) and asymmetric virtual partitions (2N×nU, 2N×nD, nL×2N, nR×2N). However, this is just one possible realisation of a set of predefined virtual partitions and in other embodiments this set can comprises more or less than six virtual partitions as well as different virtual partitions to the ones shown in FIG. 5.

Figure 6:
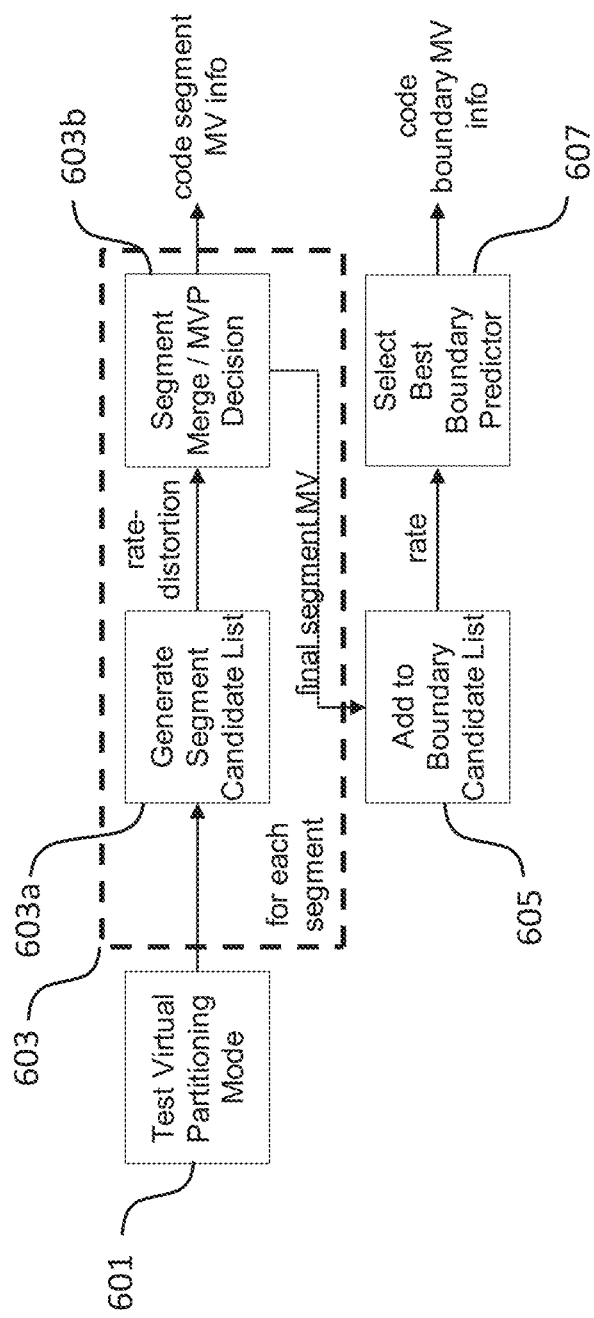
FIG. 6 shows a schematic diagram illustrating different aspects of a segmentation based partitioning approach implemented in embodiments of the invention (predicting segment and boundary motion vectors)

FIG. 6 shows the prediction process implemented in an embodiment of the encoding apparatus 100, and in particular describes processing steps performed by the units 115a and 115c illustrated in FIG. 3. In a first stage a segment wise-prediction is performed (blocks 601, 603, 603a and 603b), followed by the prediction of the boundary motion vector in a second stage (blocks 605 and 607). More specifically, in block 601, a rectangular partitioning mode can be selected from the available set of partitioning modes as for example specified by blocks 500a to 500f in FIG. 5 and be denoted as the virtual partitioning mode of the current SBP block. According to the selected virtual partitioning mode, motion vector candidate lists can be generated for each segment by block 603a, where the candidate list entries depend on the shape of the virtual partitioning and the availability of motion vectors. The neighbouring positions that are checked for availability are exemplified in FIG. 7. The candidate list can be input to the following "Merge/MVP decision" in block 603b, where it is determined based on a rate-distortion cost criterion, whether the current segment pixels are predicted by a motion vector from the candidate list ("Merge"), or if the motion vector found through motion estimation in block 115b ("MVP") is used. According to the selected mode, different motion side-information can be passed to the entropy coder. The resulting segment motion vector can be added to the list of boundary motion vector predictor candidates as shown in block 605. The process is repeated for the next segment. If all segments have been processed, block 607 can compute rate-estimates for each predictor candidate. A segment vector is taken from the list and set as the predictor for the boundary motion vector determined by block 115a.

In an embodiment, two options of motion vector prediction are available for each segment motion vector, which are both based on a candidate list of motion vector predictors:

A first option is merging of the segment motion vector with a motion vector of the spatial or temporal neighborhood. The motion vector of a segment is predicted entirely from a merge candidate list of motion vectors, which is constructed from spatial and temporal neighbors of the current block 400. The temporal candidate motion vector is scaled according to its relative temporal location, if it associated with a different reference picture than the current reference picture. The candidate list implicitly depends on the chosen virtual partitioning 500a-f, as will be described in more detail further below. In this case of motion vector merging, according to an embodiment, only a merge index is signaled and no further motion vector difference, reference picture index or predictor index is encoded.

A second option is regular motion vector prediction (MVP). In an embodiment, the derived candidate list is truncated after the first two entries. The encoding processor 105 and/or the inter prediction unit 115 can chose a rate-optimal predictor by measuring the coding cost for the remaining motion vector difference, after subtracting the motion vector predictor from the estimated segment or boundary motion vector. In an embodiment, the motion vector difference, predictor index and reference picture index can be encoded in this case.

The boundary motion vector $MV_b$ may be predicted from one of the segment motion vectors $MV_{s,0}$, $MV_{s,1}$, which can be signaled using a predictor index. As in the case of a temporal merge candidate, the segment motion vectors $MV_{s,0}$, $MV_{s,1}$ and the boundary motion vector $MV_b$ can be associated with different reference pictures (frames) and a scaling of each segment motion vector $MV_s$ may be applied based on the following equation:

$$MV_{s,p} = \frac{t_b}{t_d} MV_s,$$

wherein $t_b$ is the temporal distance between current- and boundary reference picture and $t_d$ is the temporal distance between current- and segment reference picture. Thus, the remaining motion vector difference can be transmitted to the decoder or apparatus 200, along with a reference picture index and a segment predictor index.

After all virtual partitions 500a-f have been tested by the encoding apparatus 100, the best performing virtual partition is selected by the encoding apparatus 100 and signaled to the decoding apparatus 200 using the virtual partition identifier. In an embodiment, the virtual partition identifier can be simply a coded index, for instance, "0" for the virtual partition 2N×N 500a, "1" for the virtual partition N×2N 500b and so on.

As already described above, each virtual partition 500a-f is associated with a possibly different subset of the video coding blocks neighboring the currently processed video coding block 400. Thus, the selected virtual partition 500a-f determines the set of potential motion vector predictor candidates for each virtual partition.

Figure 7:
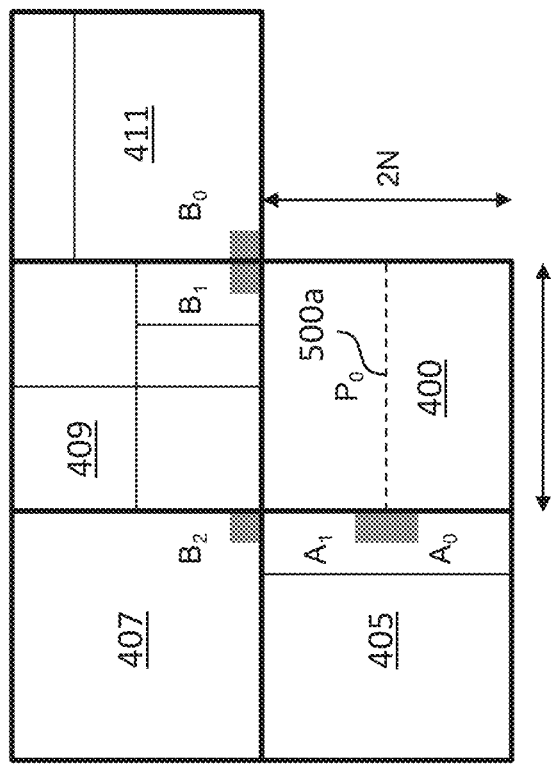
FIG. 7 shows a schematic diagram illustrating different aspects of a segmentation based partitioning approach implemented in embodiments of the invention (prediction of motion vectors using neighboring video coding blocks)

FIG. 7 exemplifies the candidate locations where the motion vector predictor candidates for the upper partition $P_0$ of the 2N×N virtual partition 500a are indicated by the sampling positions $A_0$, $A_1$, $B_0$, $B_1$ and $B_2$ of the neighbouring motion vector field. It is clear that different virtual partitioning configurations result in different sampling positions of the motion vector field neighborhood.

For each virtual partitioning 500a-f, a candidate list of motion vector predictors can be constructed from the spatial and co-located, temporal neighborhood of the currently processed video coding block 400. In an embodiment, the spatial neighbouring locations, i.e. the neighbouring blocks, are tested in the following order:

$A_1 \rightarrow B_1 \rightarrow B_0 \rightarrow A_0 \rightarrow B_2$

In an embodiment, on the basis of the top left pixel of the current partition sub block, the sampling locations can be derived as the following neighbouring block locations:

$A_0$: lower left
$A_1$: left
$B_0$: top right
$B_1$: top
$B_2$: top left

Figure 8:
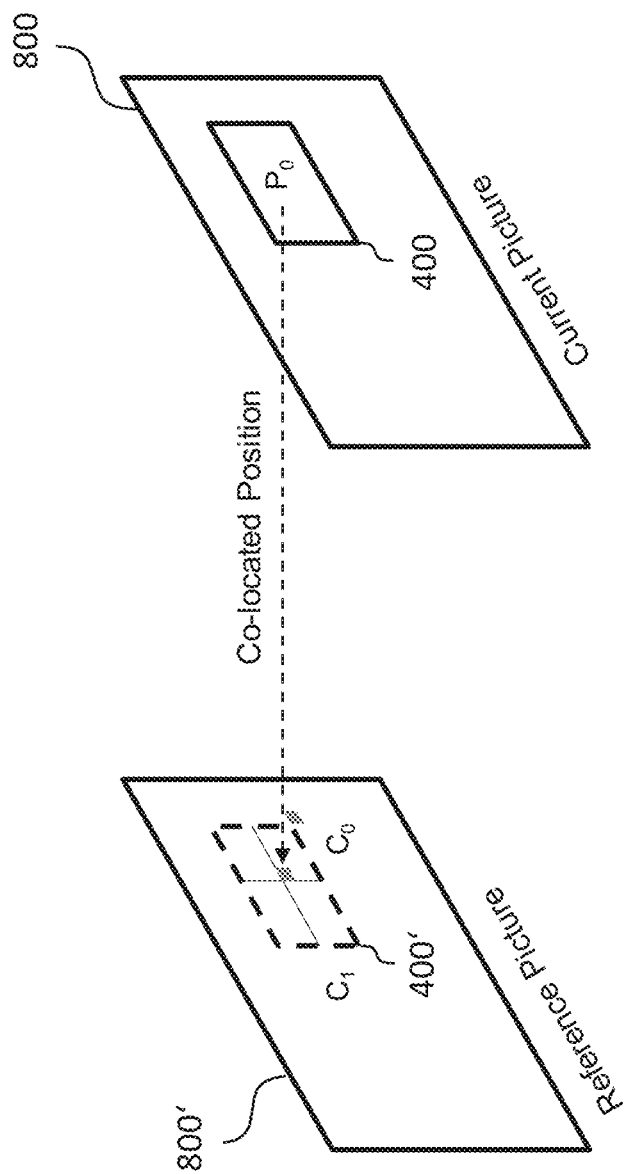
FIG. 8 shows a schematic diagram illustrating different aspects of a segmentation based partitioning approach implemented in embodiments of the invention (prediction of motion vectors using the co-located video coding block of temporally neighboring frame)

In an embodiment, two more temporal candidates $C_0$ and $C_1$ can be tested and added to the candidate list. As shown in FIG. 8, the two more temporal candidates $C_0$ and $C_1$ can be taken from a reference frame 800' of the currently processed frame 800 at a co-located position of the currently processed video coding block 400 (corresponding to the co-located video coding block 400'), wherein $C_0$ and $C_1$ are positioned as follows:

$C_0$: co-located bottom right
$C_1$: co-located center

For each of these spatial and temporal positions, it can be checked, whether the tested positions belong to an inter-coded block and whether motion vectors are already available. If the condition holds, each available motion vector can be added to the candidate list, if it has not been added already before in a previous step. For the second part of the virtual partition 500a, the derivation process may differ: the sampling location $A_1$ can be omitted for the candidate list construction of $P_1$ if the virtual partition is a vertical mode.

Accordingly, the sampling position $B_1$ can be omitted in the candidate list construction of $P_1$ if the virtual partition is a horizontal mode.

For each encoded block, the decoding apparatus 200 can adaptively generate a segmentation from reference pictures using the segmentation apparatus 121*b*. In order to obtain the correct segmentation—matching the segmentation which has been determined to be rate-distortion optimal by the encoding apparatus 100—the decoding apparatus 100 may need additional information, for instance, an indicator which reference picture is segmented, a motion vector locating the area to be segmented in the reference picture, and/or additional parameters that steer the segmentation process itself.

The segment-wise motion information needed for the reconstruction of an SBP block can be decoded and arranged according to the selected virtual partition 500*a-f* and therefore appears to be identical to the case of regular block based partitioning. Thus, decoding steps already specified for regular block based partitioning can be reused for the case of SBP as implemented by embodiments of the invention and only an additional flag needs to be decoded. In terms of memory access and future referencing of SBP blocks in the decoding apparatus 200, it is useful to store the motion information in a block based manner.

Figure 9:
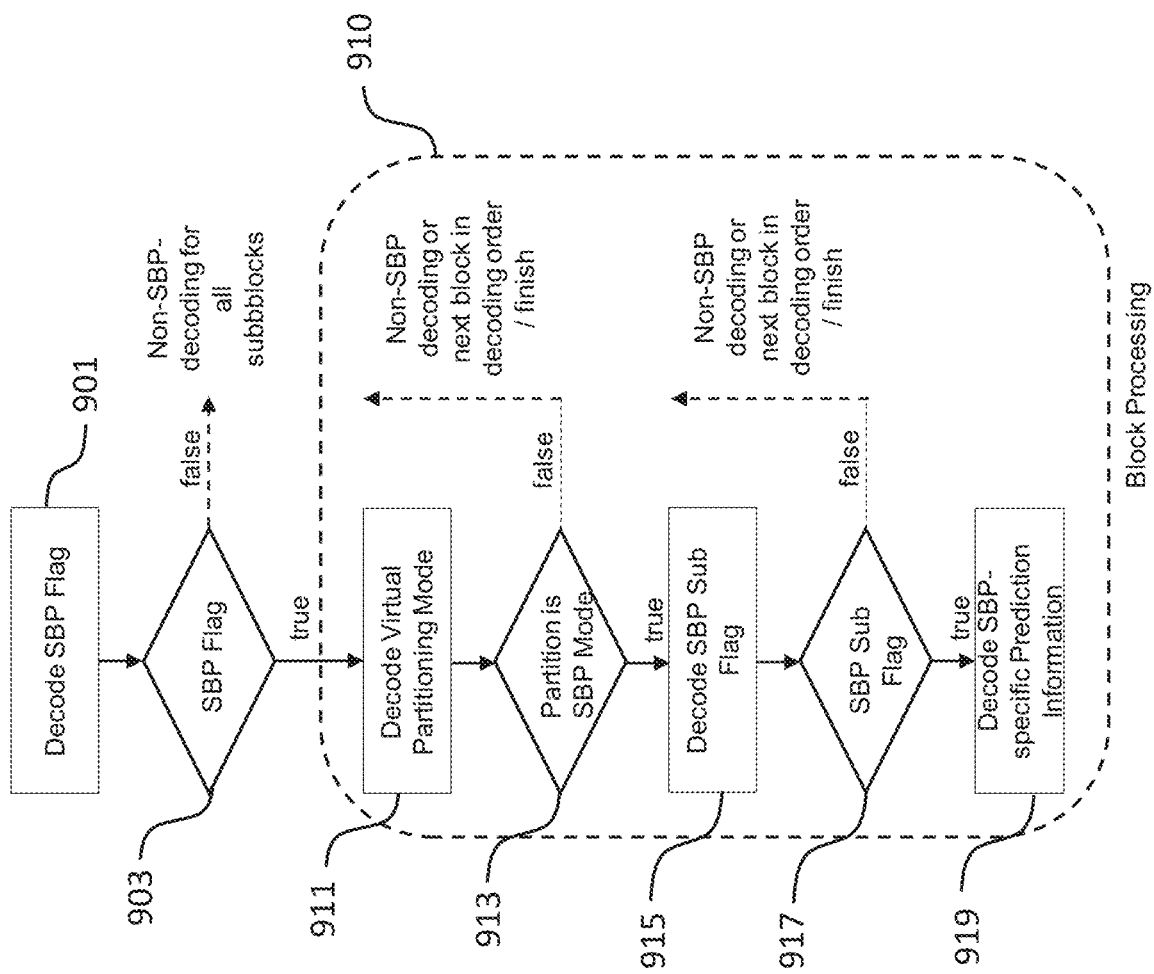
FIG. 9 shows a schematic diagram illustrating different aspects of a segmentation based partitioning approach implemented in embodiments of the invention (mode signaling for segmentation based partitioning in conjunction with virtual partitioning and the block based decoding aspects)

FIG. 9 shows an overview of the mode signaling for segmentation based partitioning (SBP) as implemented in embodiments of the invention in conjunction with the block based decoding aspects. Intermediary decoding steps not relevant to SBP, such as decoding of transform coefficients etc. have been omitted in FIG. 9 for the sake of clarity. Signaling of SBP can be achieved through a combination of flags at different levels of the coding hierarchy. In an embodiment, the following steps are performed, if SBP is enabled for a currently processed frame:

1. At the root of a coding tree block, the SBP Flag is decoded (block 901 of FIG. 9). The value "true" signals if a sub block is using SBP. If the value of the flag is "false", it can be assumed that all sub blocks are using regular block partitioning and no further flags or symbols referring to SBP need to be decoded (block 903 of FIG. 9).

2. The virtual partition (also referred to as virtual partitioning mode) is decoded, which specifies the virtual partition of the motion information for SBP or the regular motion partitioning (blocks 911, 913 of FIG. 9). As already described above, according to the decoded virtual partition different prediction candidate lists are constructed for the further prediction and reconstruction process.

3. Before segment- or partition-wise decoding of the prediction information, the SBP Sub Flag is decoded (block 915 of FIG. 9), indicating whether SBP is used in the current block (block 917 of FIG. 9). This flag is only decoded if the root SBP Flag is set to "true". Further, this flag is only decoded if the virtual partition belongs to the predefined group of SBP modes. If the value of the flag is "true", SBP is used for the current block. Otherwise, regular block based partitioning is used.

4. If the SBP Sub Flag is set to "true", SBP is enabled for the current block and segment-wise decoding starts. The SBP Flag also indicates, that segmentation related information, such as a segmentation reference picture index, predictor index and boundary motion vector difference need to be decoded (block 919 of FIG. 9).

In an embodiment, the following additional steps are performed for each segment:

1. The decoding steps for each partition/segment are performed. In general, a segment motion vector can be determined via merge mode or MVP (motion vector prediction) mode, depending on the value of the decoded merge flag. In the first case, if the value of the merge flag is true, a merge index can be decoded, specifying which candidate of the merge candidate list is to be used.

2. In the case of MVP (motion vector prediction), the following symbols can be decoded from the bitstream provided by the encoding apparatus 100: the inter prediction direction index, which specifies whether uni-, bi- or weighted-prediction is used for the current segment and thus, the number of motion vectors per segment. According to the number of motion vectors, a reference picture index, motion vector difference and candidate predictor index can be decoded. The merge and MVP candidate list is constructed according to the virtual partition and may contain spatial and temporal neighbors of the current block, which have already been decoded. The list construction is identical to the description above for the corresponding process implemented in the encoding apparatus 100 according to an embodiment.

3. After processing of the segments, the boundary related information can decoded. The additional information can comprise the segmentation reference picture index, a predictor index and a motion vector difference.

4. The motion vector locating the boundary in the decoded segmentation reference picture can be derived. The final boundary motion vector $MV_b$ is the sum of a motion vector predictor $MV_{s,MVPIdxb}$ and a motion vector difference $MVd_b$, i.e.:

$$MV_b = M_{s,MVPIdxb} + MVd_b.$$

5. If specified by the segmentation settings, additional segmentation controlling information can be decoded. Segmentation can be performed accordingly. Otherwise the currently processed video coding block can be segmented by an automated method and no further information is decoded.

6. Segmentation is performed on the specified reference picture by the segmentation apparatus 121*b* and may include methods of pre- and post-processing. The result is a labeled segmentation mask of size equal to the currently processed block, where each labeled region is associated with a segment.

Figure 10:
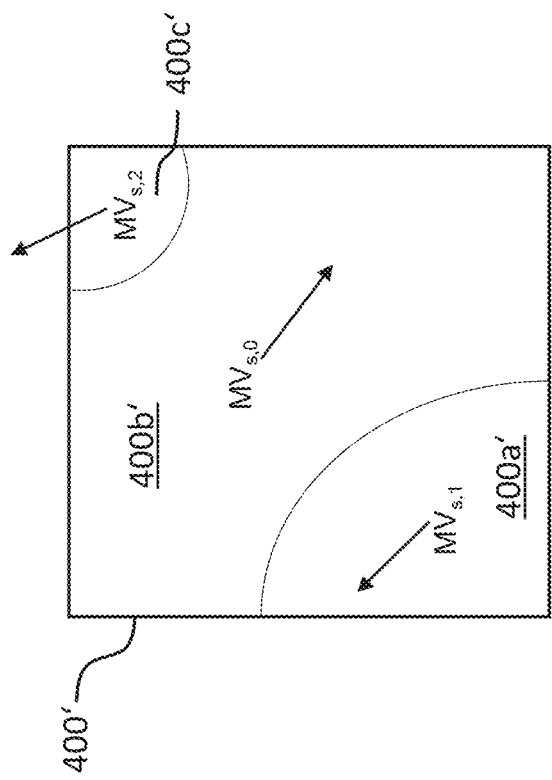
FIG. 10 shows a schematic diagram of an exemplary prediction block, which comprises three distinct segments.

With above step 6 the decoding of the segmentation based partitioning information can finish and the inter-prediction based reconstruction of the currently processed video coding block can start. In an embodiment, a block can be reconstructed with regard to the segmentation mask according to the following scheme:

$$PredB(x) = RefB(x - MV_{s,0}) * Mask_{s,0} + RefB(x - MV_{s,1}) * Mask_{s,1} + \ldots + RefB(x - M_{s,Np}) * Mask_{s,Np},$$

wherein "PredB" denotes the predicted block at the current location x and "RefB" denotes the reference blocks according to the decoded reference picture indices of each segment. "Mask" represents the labeled segmentation mask, where the index denotes the respective labeled region of the segmentation mask. Each labeled region is associated with a motion vector MV, belonging to the segment. The motion vector locates the region in the reference picture, based on the temporally co-located position. FIG. 10 shows an example prediction block 400', which was generated from three distinct segments 400*a'*, 400*b'* and 400*c'*. Thus, the resulting prediction block 400' is a pixel-wise combination of motion compensated regions taken from the reference picture.

Figure 11:
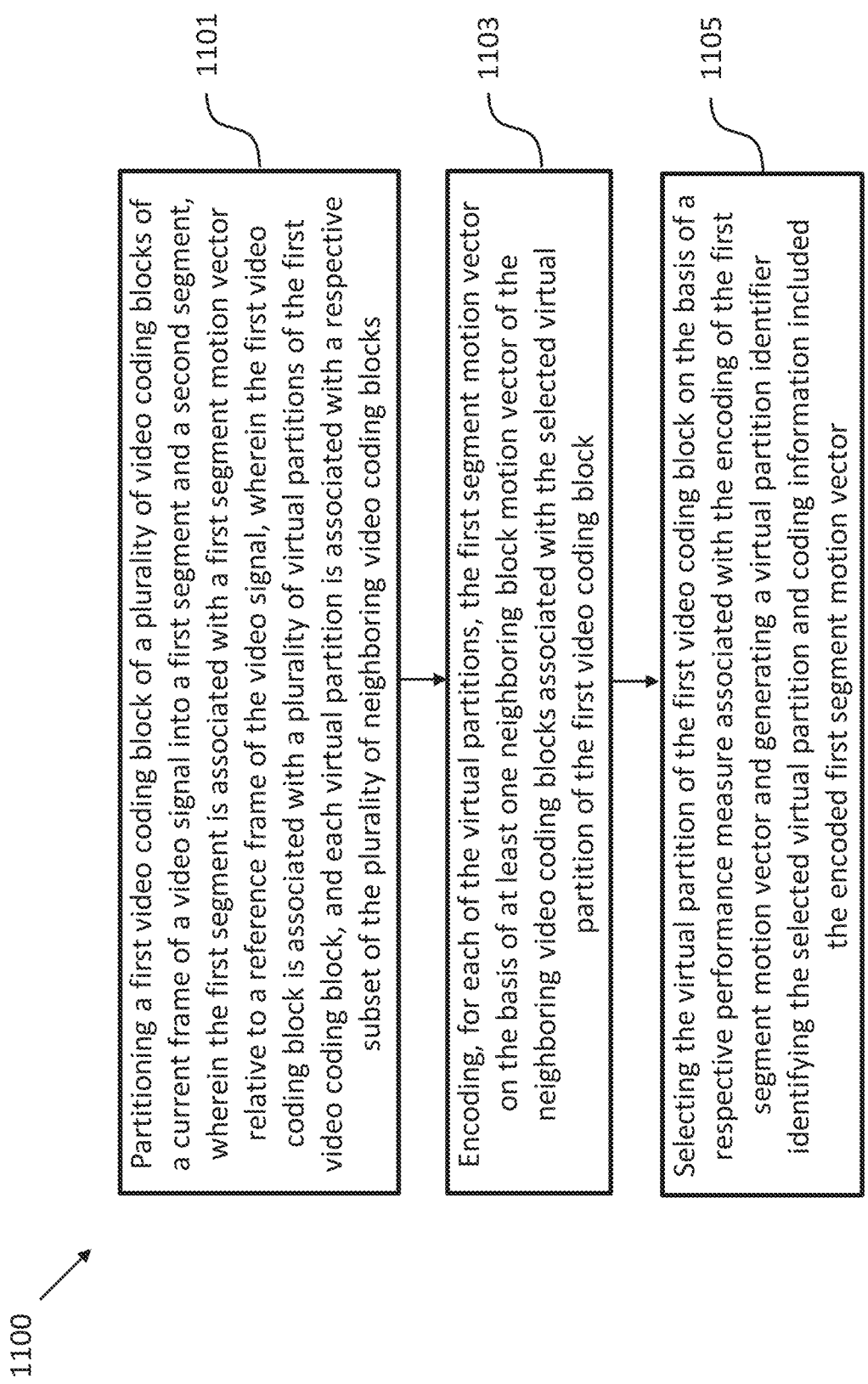
FIG. 11 shows a schematic diagram illustrating a method for encoding a video signal according to an embodiment.

FIG. 11 shows a schematic diagram of a method 1100 for encoding a video signal according to an embodiment, wherein the video signal comprises a plurality of frames and each frame is dividable into a plurality of video coding blocks, including, for instance, the first video coding block 403.

The method 1100 comprises a first step 1101 of partitioning the first video coding block 403 of the plurality of video coding blocks of a currently processed frame of the video signal into a first segment and a second segment, wherein the first segment is associated with a first segment motion vector relative to a reference frame of the video signal and wherein the first video coding block 403 is associated with a plurality of predefined virtual partitions 500*a-f* of the first video coding block 403, i.e. the first video coding block 403 can be partitioned by the plurality of predefined virtual partitions 500*a-f*. Each virtual partition 500*a-f* is associated with a respective subset of the plurality of video coding blocks of the current frame of the video signal, wherein each video coding block of the respective subset neighbors the first video coding block 403 and is associated with a respective motion vector.

The method 1100 comprises a further step 1103 of encoding, for each of the virtual partitions 500*a-f*, the first segment motion vector on the basis of at least one neighboring block motion vector of the neighboring video coding blocks associated with the selected virtual partition 500*a-f* of the first video coding block 403.

The method 1100 comprises a further step 1105 of selecting the virtual partition 500*a-f* of the first video coding block 403 on the basis of a respective performance measure associated with the encoding of the first segment motion vector 403 and generating a virtual partition identifier identifying the selected virtual partition 500*a-f* and coding information including the encoded first segment motion vector.

FIG. 12 shows a schematic diagram of a method 1200 for decoding an encoded video signal according to an embodiment, wherein the encoded video signal comprises a plurality of frames and each frame is divided into a plurality of video coding blocks, including, for instance, the first video coding block 403.

The method 1200 comprises the steps of: receiving 1201 coding information and a virtual partition identifier for decoding the first video coding block 403 in a currently decoded frame; selecting 1203 a virtual partition 500*a-f* of the first video coding block 403 based on the virtual partition identifier, wherein the virtual partition 500*a-f* is associated with a subset of the plurality of video coding blocks of the currently decoded frame of the encoded video signal and wherein each video coding block of the subset neighbors the first video coding block 403; decoding 1205 the first segment motion vector on the basis of at least one motion vector of the neighboring video coding blocks associated with the identified virtual partition 500*a-f* of the first video coding block 403; partitioning 1207 a co-located first video coding block in a first reference frame of the encoded video signal into at least a first segment and a second segment; and performing 1209 motion compensation for the first segment based on the decoded first segment motion vector. In an embodiment, the method 1200 can comprise prior to the partitioning step 1207 a further step of decoding a boundary motion vector associated with the partition into the first segment and the second segment.

While a particular feature or aspect of the disclosure may have been disclosed with respect to only one of several implementations or embodiments, such feature or aspect may be combined with one or more other features or aspects of the other implementations or embodiments as may be desired and advantageous for any given or particular application. Furthermore, to the extent that the terms "include", "have", "with", or other variants thereof are used in either the detailed description or the claims, such terms are intended to be inclusive in a manner similar to the term "comprise". Also, the terms "exemplary", "for example" and "e.g." are merely meant as an example, rather than the best or optimal. The terms "coupled" and "connected", along with derivatives may have been used. It should be understood that these terms may have been used to indicate that two elements cooperate or interact with each other regardless whether they are in direct physical or electrical contact, or they are not in direct contact with each other.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

Many alternatives, modifications, and variations will be apparent to those skilled in the art in light of the above teachings. Of course, those skilled in the art readily recognize that there are numerous applications of the invention beyond those described herein. While the present invention has been described with reference to one or more particular embodiments, those skilled in the art recognize that many changes may be made thereto without departing from the scope of the present invention. It is therefore to be understood that within the scope of the appended claims and their equivalents, the invention may be practiced otherwise than as specifically described herein.

What is claimed is:

1. An apparatus for encoding a video signal, the video signal comprising a plurality of frames, each frame being dividable into a plurality of video coding blocks, the apparatus comprising:
a partitioner configured to partition a first video coding block of the plurality of video coding blocks of a current frame of the video signal into a first segment and a second segment, wherein the first segment is associated with a first segment motion vector relative to a first reference frame of the video signal, and wherein the first and second segment have an irregular shape, wherein the first video coding block is associated with a plurality of predefined virtual partitions of the first video coding block, and each predefined virtual partition is associated with a respective subset of the plurality of video coding blocks of the current frame of the video signal, wherein each video coding block of the respective subset neighbors the first video coding block and is associated with a motion vector;
an encoding processor configured to encode, for each of the virtual partitions, the first segment motion vector on the basis of at least one motion vector of the neighboring video coding blocks associated with a selected virtual partition for encoding the first video coding block; and
a selector configured to select the virtual partition of the first video coding block on the basis of a respective performance measure associated with the encoding of the first segment motion vector, and to generate a virtual partition identifier identifying the virtual partition selected by the selector and coding information including the encoded first segment motion vector.

2. The apparatus of claim 1, wherein the selector is configured to select the virtual partition of the first video coding block on the basis of a respective rate distortion measure associated with the encoding of the first segment motion vector.

3. The apparatus of claim 1, wherein the encoding processor is configured to encode the first segment motion vector on the basis of at least one motion vector of the neighboring video coding blocks associated with the selected virtual partition of the first video coding block and at least one motion vector of a co-located video coding block in a neighboring frame of the video signal.

4. The apparatus of claim 1, wherein the encoding processor is configured to encode the virtual partition identifier along with the first video coding block.

5. The apparatus of claim 1, wherein a boundary motion vector is associated with a boundary between the first segment and the second segment of the first video coding block and wherein the encoding processor is configured to encode the boundary motion vector on the basis of at least one of the first segment motion vector and a second segment motion vector associated with the second segment.

6. The apparatus of claim 5, wherein the encoding processor is configured to encode the boundary motion vector by rescaling a first segment motion vector of the co-located video coding block in a reference frame.

7. The apparatus of claim 1, wherein the encoding processor is configured to encode the first segment motion vector on the basis of at least one motion vector of the neighboring video coding blocks associated with the selected virtual partition of the first video coding block using motion vector merging.

8. The apparatus of claim 1, wherein the set of virtual partitions of the first video coding block comprises the partitions 2N×N, N×2N, 2N×nU, 2N×nD, nL×2N and nR×2N of the first video coding block.

9. A method for encoding a video signal, the video signal comprising a plurality of frames, each frame being dividable into a plurality of video coding blocks, the method comprising:
   partitioning a first video coding block of the plurality of video coding blocks of a current frame of the video signal into a first segment and a second segment, wherein the first segment is associated with a first segment motion vector relative to a reference frame of the video signal, and wherein the first and second segment have an irregular shape and wherein the first video coding block is associated with a plurality of predefined virtual partitions of the first video coding block, and each predefined virtual partition is associated with a respective subset of the plurality of video coding blocks of the current frame of the video signal, wherein each video coding block of the respective subset neighbors the first video coding block and is associated with a motion vector;
   encoding, for each of the virtual partitions, the first segment motion vector on the basis of at least one motion vector of the neighboring video coding blocks associated with a selected virtual partition of the first video coding block; and
   selecting the virtual partition of the first video coding block on the basis of a respective performance measure associated with the encoding of the first segment motion vector and generating a virtual partition identifier identifying the selected virtual partition and coding information including the encoded first segment motion vector.

10. An apparatus for decoding an encoded video signal, the encoded video signal comprising a plurality of frames, each frame being dividable into a plurality of video coding blocks, the apparatus comprising:
   a decoding processor configured to:
   receive coding information and a virtual partition identifier for decoding a first video coding block in a current frame,
   select a virtual partition of the first video coding block based on the decoded virtual partition identifier, wherein the virtual partition is associated with a subset of the plurality of video coding blocks of the current frame of the encoded video signal, and wherein each video coding block of the subset neighbors the first video coding block; and
   decode the first segment motion vector on the basis of at least one motion vector of the neighboring video coding blocks associated with a identified virtual partition of the first video coding block; and
   a partitioner configured to partition a co-located first video coding block in a first reference frame of the encoded video signal into a first segment and a second segment, wherein the first and second segment have an irregular shape, and
   wherein the decoding apparatus is further configured to perform motion compensation for the first segment based on the decoded first segment motion vector.

11. The apparatus of claim 10, wherein the decoding processor is configured to decode the first segment motion vector on the basis of at least one motion vector of the neighboring video coding blocks associated with the virtual partition of the first video coding block and at least one motion vector of a video coding block in a neighboring frame of the encoded video signal.

12. The apparatus of claim 10, wherein the decoding processor is configured to decode the first segment motion vector on the basis of at least one motion vector of the neighboring video coding blocks associated with the virtual partition of the first video coding block using motion vector merging.

13. The apparatus of claim 10, wherein the virtual partition of the first video coding block is one of the following partitions: a 2N×N, N×2N, 2N×nU, 2N×nD, nL×2N or nR×2N partition of the first video coding block.

14. The apparatus of claim 10, wherein the decoding processor is configured to decode a boundary motion vector associated with a boundary between the first segment and the second segment on the basis of the first segment motion vector and wherein the partitioner is configured to partition the co-located first video coding block in the first reference frame of the encoded video signal into the first segment and the second segment on the basis of the decoded boundary motion vector.

15. A method for decoding an encoded video signal, the encoded video signal comprising a plurality of frames, each frame being dividable into a plurality of video coding blocks, the method comprising:
   receiving coding information and a virtual partition identifier for decoding a first video coding block in a current frame,
   selecting a virtual partition of the first video coding block based on the virtual partition identifier, wherein the virtual partition is associated with a subset of the plurality of video coding blocks of the current frame of the encoded video signal, and wherein each video coding block of the subset neighbors the first video coding block;

decoding the first segment motion vector on the basis of at least one motion vector of the neighboring video coding blocks associated with a identified virtual partition of the first video coding block;

partitioning a co-located first video coding block in a first reference frame of the encoded video signal into a first segment and a second segment, wherein the first and second segment have an irregular shape; and performing motion compensation for the first segment based on the decoded first segment motion vector.

* * * * *

UNITED STATES PATENT AND TRADEMARK OFFICE
CERTIFICATE OF CORRECTION

PATENT NO. : 10,931,965 B2
APPLICATION NO. : 16/227317
DATED : February 23, 2021
INVENTOR(S) : Zhao et al.

It is certified that error appears in the above-identified patent and that said Letters Patent is hereby corrected as shown below:

On the Title Page

Page 2, item (56) Other Publications Citation No. 4: "Condo et al.," should read -- Kondo et al., --.

Page 2, item (56) Other Publications Citation No. 19: "Royce," should read -- Boyce, --.

Signed and Sealed this
Twelfth Day of July, 2022

Katherine Kelly Vidal
*Director of the United States Patent and Trademark Office*